(12) United States Patent
Miketa et al.

(10) Patent No.: US 10,075,649 B2
(45) Date of Patent: Sep. 11, 2018

(54) IMAGE CAPTURING APPARATUS AND IMAGE CAPTURING METHOD FOR EXPOSURE COMPENSATION IN HIGH DYNAMIC RANGE SYNTHESIZED IMAGES

(71) Applicant: SONY CORPORATION, Tokyo (JP)

(72) Inventors: Rika Miketa, Fukuoka (JP); Katsumi Katou, Tokyo (JP); Daisuke Koyanagi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/312,092

(22) PCT Filed: May 29, 2015

(86) PCT No.: PCT/JP2015/065536
§ 371 (c)(1),
(2) Date: Nov. 17, 2016

(87) PCT Pub. No.: WO2015/190320
PCT Pub. Date: Dec. 17, 2015

(65) Prior Publication Data
US 2017/0094145 A1   Mar. 30, 2017

(30) Foreign Application Priority Data

Jun. 11, 2014   (JP) .................. 2014-121012

(51) Int. Cl.
*H04N 5/235*   (2006.01)
*H04N 5/232*   (2006.01)

(52) U.S. Cl.
CPC ....... *H04N 5/2351* (2013.01); *H04N 5/23229* (2013.01)

(58) Field of Classification Search
CPC .................. H04N 5/2351; H04N 5/23229
See application file for complete search history.

(56) References Cited

U.S. PATENT DOCUMENTS

2005/0207629 A1   9/2005   Toyoda
2008/0253650 A1*  10/2008  Kuniba .................. H04N 1/407
                                                    382/167
(Continued)

FOREIGN PATENT DOCUMENTS

CN   1671201 A   9/2005
EP   1578110 A3  2/2008
(Continued)

OTHER PUBLICATIONS

International Search Report and Written Opinion of PCT Application No. PCT/JP2015/065536, dated Aug. 18, 2015, 6 pages of English Translation and 6 pages of ISRWO.

*Primary Examiner* — Gevell Selby
(74) *Attorney, Agent, or Firm* — Chip Law Group (57) ABSTRACT

The present technology relates to an image capturing apparatus and an image capturing method that a high dynamic range synthesized image can be subjected to exposure compensation desired by a user. There is provided an image capturing apparatus including an image capturing unit that captures an image of an object and generates a captured-image data item; an exposure compensation amount setting unit that sets an exposure compensation amount for compensating an exposure amount of the image capturing unit; an exposure control unit that controls exposure of the image capturing unit on the basis of the exposure compensation amount set by the exposure compensation amount setting unit; a signal synthesizing unit that synthesizes a plurality of the captured-image data items captured by the image capturing unit at a plurality of different exposure amounts set by the exposure control unit and generates a synthesized data (Continued)

item; a gradation conversion unit that converts gradation of the synthesized data item generated by the signal synthesizing unit; and a gradation control unit that controls gradation conversion by the gradation conversion unit on the basis of the exposure compensation amount set by the exposure compensation amount setting unit. The present technology is applicable to an image capturing apparatus such as a digital still camera including an exposure compensation function.

5 Claims, 10 Drawing Sheets

(56) References Cited

U.S. PATENT DOCUMENTS

| 2013/0229546 | A1* | 9/2013 | Furumura | H04N 5/23238 |
| | | | | 348/229.1 |
| 2014/0307129 | A1* | 10/2014 | Feng | H04N 5/2173 |
| | | | | 348/242 |
| 2015/0355443 | A1* | 12/2015 | Okabe | H04N 5/2355 |
| | | | | 348/80 |
| 2016/0352995 | A1* | 12/2016 | Min | H04N 5/2355 |

FOREIGN PATENT DOCUMENTS

| JP | 2005-269144 A | 9/2005 |
| JP | 2011-119944 A | 6/2011 |
| JP | 2014-27460 A | 2/2014 |
| JP | 2014-45274 A | 3/2014 |

* cited by examiner

IMAGE CAPTURING APPARATUS AND IMAGE CAPTURING METHOD FOR EXPOSURE COMPENSATION IN HIGH DYNAMIC RANGE SYNTHESIZED IMAGES

CROSS REFERENCE TO RELATED APPLICATIONS

This application is a U.S. National Phase of International Patent Application No. PCT/JP2015/065536 filed on May 29, 2015, which claims priority benefit of Japanese Patent Application No. JP 2014-121012 filed in the Japan Patent Office on Jun. 11, 2014. Each of the above-referenced applications is hereby incorporated herein by reference in its entirety.

TECHNICAL FIELD

The present technology relates to an image capturing apparatus and an image capturing method, and in particular, to an image capturing apparatus and an image capturing method that exposure compensation desired by a user can be performed to a high dynamic range synthesized image.

BACKGROUND ART

In an image capturing apparatus such as a digital still camera, a high dynamic range synthesis mode (hereinafter referred to as an "HDR mode") is known as a mode to effectively capture an image of an object having a wide dynamic range. This kind of the image capturing apparatus almost has an exposure compensation function that changes exposure set by an automatic exposure control.

Patent Document 1 discloses a technology that changes width and narrowness of a dynamic range in a synthesized image acquired by synthesizing high sensitivity image data and low sensitivity image data.

Patent Document 1: Japanese Patent Application Laid-open No. 2004-222183

SUMMARY OF INVENTION

Problem to be Solved by the Invention

In an image capturing apparatus that can set the HDR mode, there is a request to adequately change the exposure to an exposure compensation value designated by the user when an image captured in the HDR mode (hereinafter referred to as a "high dynamic range synthesized image") is subjected to exposure compensation.

The present technology is made in view of such a circumstance, and the high dynamic range synthesized image can be subjected to the exposure compensation desired by the user.

Means for Solving the Problem

An image capturing apparatus according to an aspect of the present technology includes an image capturing unit that captures an image of an object and generates a captured-image data item; an exposure compensation amount setting unit that sets an exposure compensation amount for compensating an exposure amount of the image capturing unit; an exposure control unit that controls exposure of the image capturing unit on the basis of the exposure compensation amount set by the exposure compensation amount setting unit; a signal synthesizing unit that synthesizes a plurality of the captured-image data items captured by the image capturing unit at a plurality of different exposure amounts set by the exposure control unit and generates a synthesized data item; a gradation conversion unit that converts gradation of the synthesized data item generated by the signal synthesizing unit; and a gradation control unit that controls gradation conversion by the gradation conversion unit on the basis of the exposure compensation amount set by the exposure compensation amount setting unit.

The gradation control unit may predict a synthesized data item before exposure compensation using the exposure compensation amount set by the exposure compensation amount setting unit and brightness information of the synthesized data item, and control gradation conversion by the gradation conversion unit according to a modulation curve generated using a result of the prediction.

The gradation control unit may use a minimum value, an average value, and a maximum value of the brightness information as the brightness information of the synthesized data item.

The gradation control unit may use the exposure compensation amount for predicting the synthesized data item before the exposure compensation different from the exposure compensation amount for compensating the exposure amount of the image capturing unit.

An image capturing method according to an aspect of the present technology corresponds to the image capturing apparatus according to an aspect of the present technology described above.

In the image capturing apparatus and the image capturing method according to aspects of the present technology, an image of an object is captured, a captured-image data item is generated, an exposure compensation amount for compensating an exposure amount of an image capturing unit is set, exposure of the image capturing unit is controlled on the basis of the exposure compensation amount, a plurality of captured-image data items captured by the image capturing unit at a plurality of different exposure amounts are synthesized, a synthesized data item is generated, gradation conversion of the generated synthesized data item is controlled on the basis of the exposure compensation amount set, and gradation of the generated synthesized data item is converted.

Effects of the Invention

According to an aspect of the present technology, the exposure compensation that the user desires can be performed to the high dynamic range synthesized image.

It should be noted that the effect described here is not necessarily limitative and may be any effect described in the present disclosure.

MODES FOR CARRYING OUT THE INVENTION

Hereinafter, an embodiment of the present technology will be described with reference to the drawings. The embodiments of the present technology will be described in the following order.
1. Gradation Conversion Control to which the Present Technology is applied
2. Configuration of Image Capturing Apparatus
3. Flow of Image Capturing Processing
4. Alternative Embodiments

1. Gradation Conversion Control to which the Present Technology is Applied (Overview of Exposure Compensation)

Figure 1:
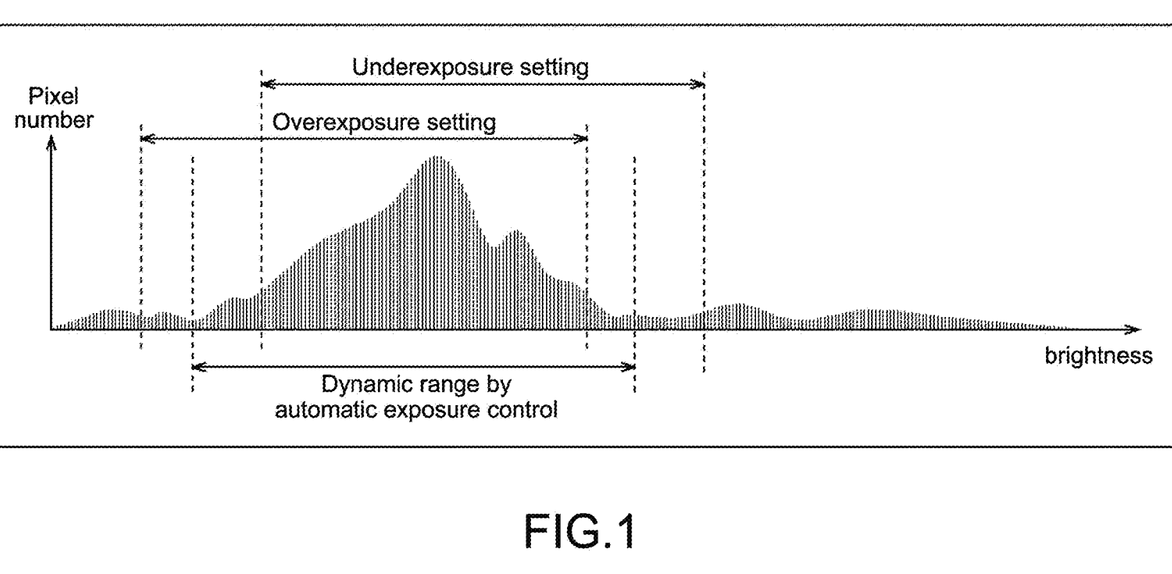
FIG. 1 is a diagram for illustrating an overview of an exposure compensation.

FIG. 1 is a diagram for illustrating an overview of an exposure compensation. In FIG. 1, a vertical axis represents a brightness of each pixel in a certain image, and means that the brightness is high from a left side to a right side in the figure. A horizontal axis represents a pixel number for every brightness, and means that the pixel number is high from a left side to a right side in the figure. In other words, a histogram in FIG. 1 represents a lightness distribution (brightness distribution) in a certain image.

As shown in FIG. 1, when the exposure compensation is performed, a dynamic range determined by an automatic exposure control is moved to an overexposure side or an underexposure side depending on the exposure compensation value (for example, ⅓ EV, −4/3 EV etc.) set by a user. That is to say, plus compensation is made for the overexposure, and minus compensation is made for the underexposure.

Note that the exposure compensation value set by the user is used for an exposure control after an exposure control unit (an exposure control unit 113 (FIG. 5) described later) converts an exposure amount to a controllable unit. In other words, a relationship between the exposure amount before and after the exposure compensation and the exposure compensation amount can be represented as follows:

Exposure compensation amount=Exposure amount after exposure compensation−Exposure amount before exposure compensation Here, in the image capturing in the HDR mode, a high dynamic range synthesized image having a wide dynamic range is generated by synthesizing a plurality of captured-image data items having different exposure amounts. Also, when the exposure compensation is performed, the exposure compensation is made to the plurality of captured-image data items having different exposure amounts acquired by the image capture in the HDR mode. In the exposure compensation, the exposure compensation amount is taken into consideration for the dynamic range determined by the automatic exposure control.

(Overview of Gradation Conversion)

A gradation compression is subjected to a synthesized data item acquired by synthesizing a plurality of captured-image data items by the automatic gradation conversion control. In other words, in the automatic exposure control, by taking the exposure compensation amount into consideration, the high dynamic range synthesized image is exposure-compensated, and then is gradation-compressed by the automatic gradation conversion control. For example, by the image capture in the HDR mode, the captured-image data item by long time exposure and the captured-image data item by short time exposure are acquired, the image captured date items are synthesized to generate a synthesized data item, and the synthesized data item are subjected to the gradation compression by the automatic gradation conversion control, whereby a data range is adjusted to be always definite.

Figure 2:
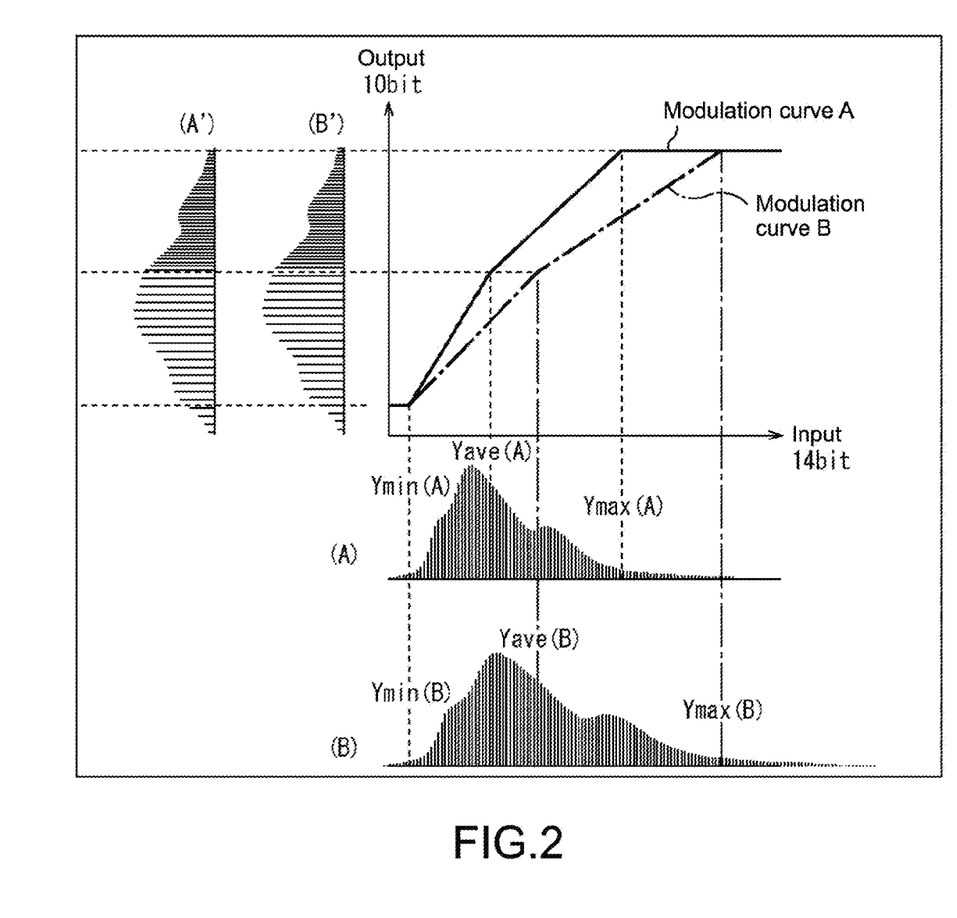
FIG. 2 is a diagram for illustrating an automatic gradation conversion control.

FIG. 2 is a diagram for illustrating the automatic gradation conversion control. In FIG. 2, a vertical axis (X axis) represents input data including a 14-bit gradation before the gradation conversion, and a horizontal axis (Y axis) represents output data including a 10-bit gradation after the gradation conversion. That is to say, in FIG. 2, by using a modulation curve, it shows an example that the synthesized data item (14-bit gradation) before the gradation conversion as the input data are gradation-compressed to the synthesized data item (10-bit gradation) after the gradation conversion as the output data.

Specifically, in a histogram A representing brightness information acquired by detecting the synthesized data item before the gradation conversion, three points, i.e., a minimum value (Ymin(A)), an average value (Yave (A)), and a maximum value (Ymax(A)) are used to generate a modulation curve A according to an output range. Then, the histogram A is converted according to the modulation curve A, thereby providing a gradation-compressed histogram A'.

In a histogram B representing brightness information acquired by detecting the synthesized data item before the gradation conversion, three points, i.e., a minimum value (Ymin(B)), an average value (Yave (B)), and a maximum value (Ymax(B)) are used to generate a modulation curve B according to an output range. Then, the histogram B is converted according to the modulation curve B, thereby providing a gradation-compressed histogram B'.

In other words, the histogram A has a range different from the histogram B in the synthesized data item before the gradation conversion, but the histogram A' has a range matched with the histogram B' in the synthesized data item after the gradation conversion. Such a gradation conversion control is performed, whereby an output data range can be thoroughly used without excessively compressing the gradation and not depending on an input data range.

In FIG. 2, it is explained that the three points, i.e., the minimum value, the average value and the maximum value of the brightness information are used when the modulation curve is generated. However, the number of the points is not determined, but any points can be used to generate the modulation curve. This may be applied to the modulation curve in other figures described later.

Figure 3:
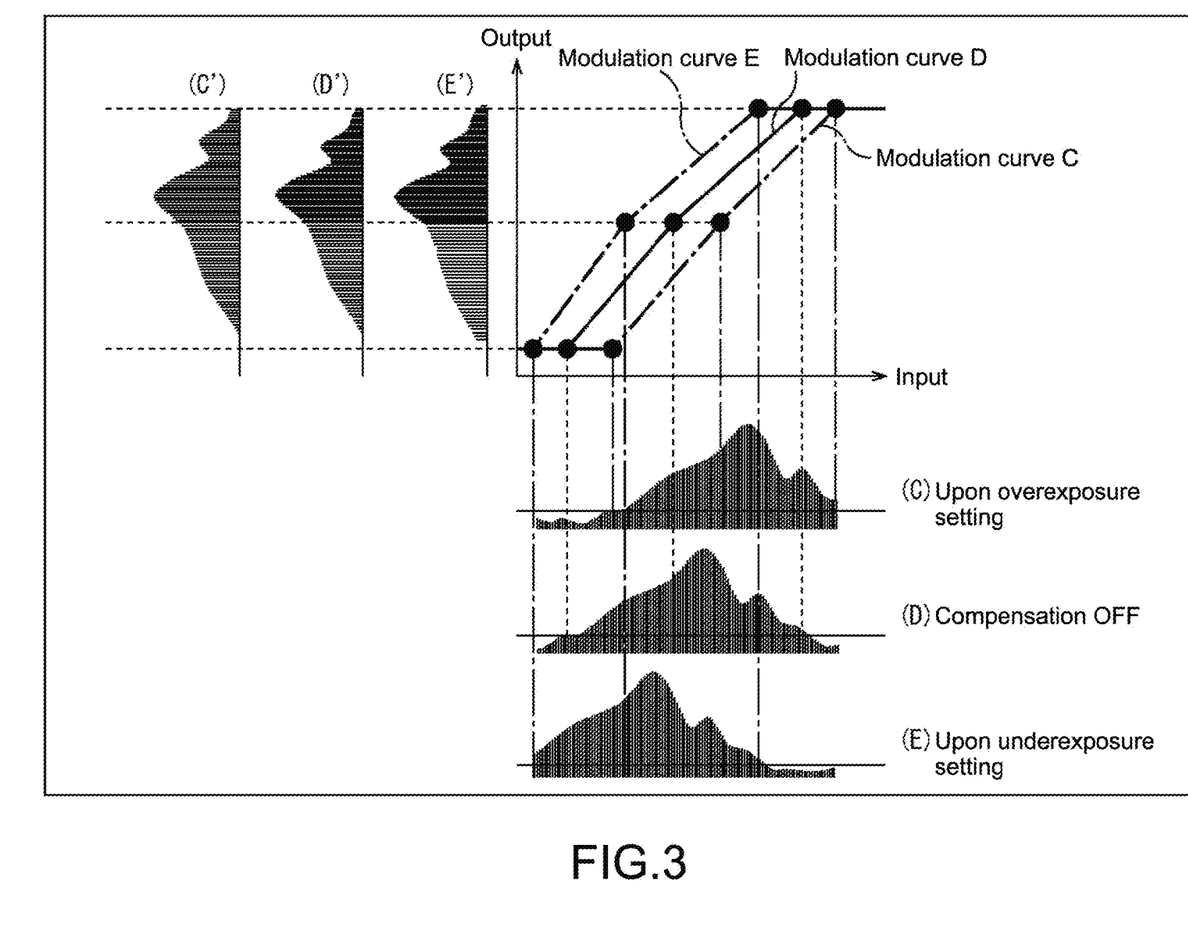
FIG. 3 is a diagram for illustrating an automatic gradation conversion control when the exposure compensation is performed.

FIG. 3 is a diagram for illustrating an automatic gradation conversion control when the exposure compensation is performed. In FIG. 3, a vertical axis (X axis) represents input data before the gradation conversion, and a horizontal axis (Y axis) represents output data after the gradation conversion.

FIG. 3 shows a histogram C upon overexposure setting, a histogram D upon exposure compensation off, and a histogram E upon underexposure setting about the synthesized data item before the gradation conversion as the input data in the X axis. Also, FIG. 3 shows a histogram C' upon overexposure setting, a histogram D' upon exposure compensation off, and a histogram E' upon underexposure setting about the synthesized data item after the gradation conversion as the output data in the Y axis.

Specifically, three points, i.e., a minimum value (Ymin (C)), an average value (Yave (C)), and a maximum value (Ymax(C)) in the histogram C representing brightness information acquired by detecting the synthesized data item before the gradation conversion upon the overexposure setting in FIG. 3, before the gradation conversion, thereby generating the modulation curve C. Then, the histogram C is converted according to the modulation curve C, thereby providing a gradation-compressed histogram C'.

Also, three points, i.e., a minimum value (Ymin(E)), an average value (Yave (E)), and a maximum value (Ymax(E)) in the histogram E representing brightness information acquired by detecting the synthesized data item before the gradation conversion upon the underexposure setting in FIG. 3, thereby generating the modulation curve E. Then, the histogram E is converted according to the modulation curve E, thereby providing a gradation-compressed histogram E'.

Upon the exposure compensation off in FIG. 3, the modulation curve D is generated from the brightness information in the histogram D (a minimum value (Ymin(D)), an average value (Yave (D)), and a maximum value (Ymax (D))). By converting the histogram D upon the exposure compensation off is converted according to the modulation curve D, the gradation-compressed histogram D' will be acquired.

Here, the histogram C, the histogram D, and the histogram E about the synthesized data item before the gradation conversion are different in the range, but the histogram C', the histogram D', and the histogram E' about the synthesized data item after the gradation conversion are matched in the range. That is to say, this means that the high dynamic range synthesized image is not an exposure-compensated image even when the user sets the exposure compensation value.

The reason is that when the modulation curve is generated, the brightness information is detected from the synthesized data item. Accordingly, for the minimum value (Ymin), the average value (Yave) and the maximum value (Ymax) of the brightness information, the exposure compensation amount is taken into consideration. Then, the modulation curve is generated from the synthesized data item, and the modulation curve generated is matched with the output data range. Any of the histograms C, D and E is converted in the same value within the output data range, and the histograms C', D' and E' are within the same range. As a result, even when the user sets the exposure compensation value, the exposure compensation is hardly reflected on the high dynamic range synthesized image.

Thus, a typical exposure compensation compensates by changing the exposure amount. The automatic gradation conversion control has a role to output the dynamic range of the input data by matching with a bit range of the output data. Accordingly, when the automatic gradation conversion control is performed after the exposure compensation, the exposure compensation is almost not reflected. According to the present technology, using the brightness information where the exposure compensation amount is taken into consideration (hereinafter referred to as "prediction brightness information"), the exposure compensation function is reflected on the high dynamic range synthesized image. Hereinafter, the gradation conversion control using the prediction brightness information as the prediction value of the image before the exposure compensation (synthesized data item) will be described.

Figure 4:
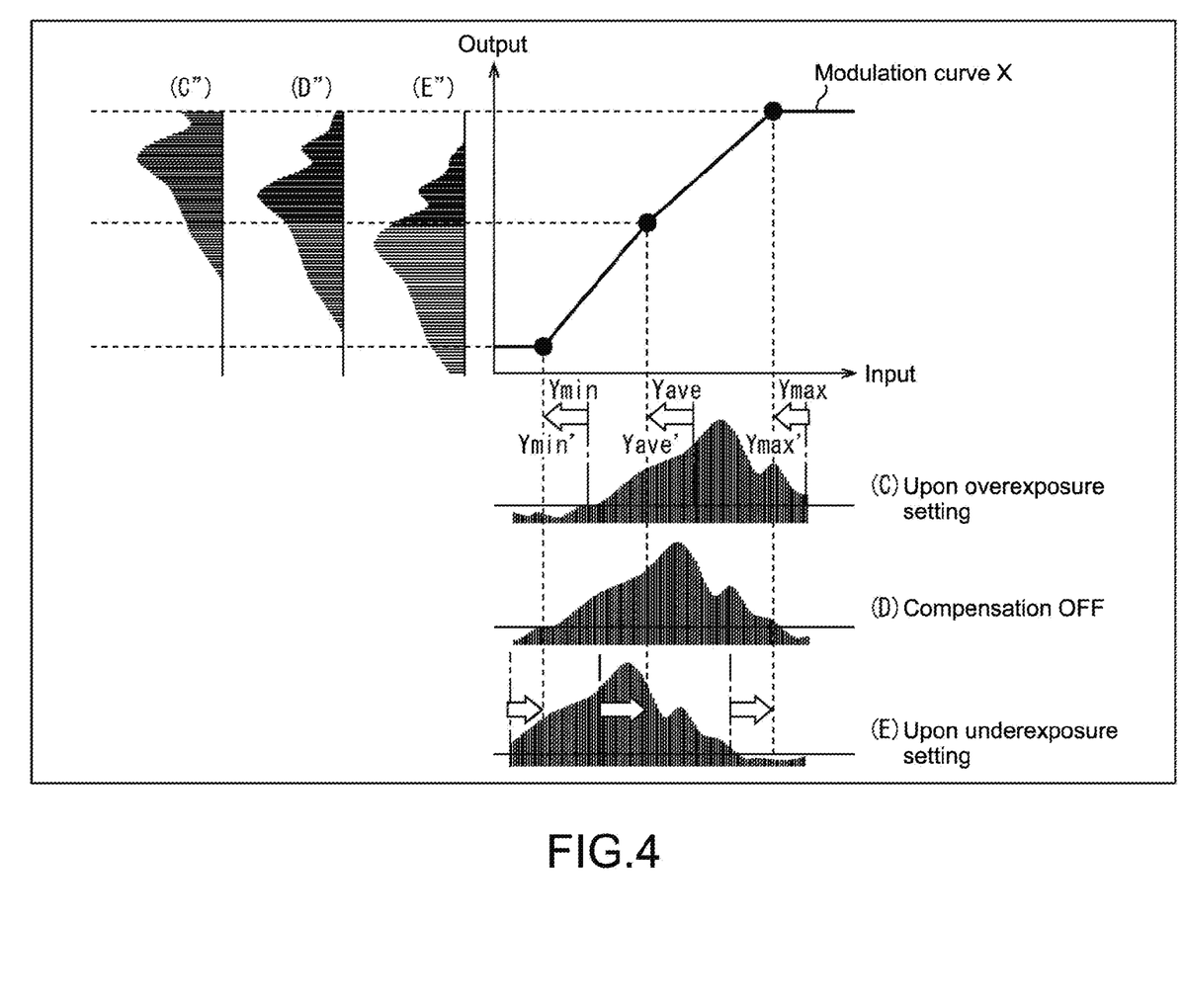
FIG. 4 is a diagram for illustrating a gradation conversion control using a prediction value.

(Gradation Conversion Control using Prediction Value) FIG. 4 is a diagram for illustrating the gradation conversion control using the prediction brightness information. In FIG. 4, a vertical axis (X axis) represents the input data before the gradation conversion, and a horizontal axis (Y axis) represents the output data after the gradation conversion.

FIG. 4 shows a histogram C upon overexposure setting, a histogram D upon exposure compensation off, and a histogram E upon underexposure setting about the synthesized data item before the gradation conversion as the input data in the X axis. Also, FIG. 4 shows a histogram C" upon overexposure setting, a histogram D" upon exposure compensation off, and a histogram E" upon underexposure setting about the synthesized data item after the gradation conversion as the output data in the Y axis.

In the gradation conversion control in FIG. 4, the brightness information acquired by detecting the synthesized data item before the gradation conversion, and the exposure compensation amount used in an exposure control are used to calculate by the following numerical formulae (1) to (3) to determine the prediction brightness information taking the exposure compensation amount into consideration.

[Numerical formula 1]

$$Y\text{min}' = 10^{\frac{-delta}{20}} \times Y\text{min} \quad (1)$$

In a numerical formula (1), Ymin' is a minimum value of the brightness information predicted from Ymin. Also, it satisfies the relation Ymin'=>MINLIMIT (physical brightness minimum value). delta[dB] is the exposure compensation amount used in the exposure compensation.

[Numerical formula 2]

$$Yave' = 10^{\frac{-delta}{20}} \times Yave \quad (2)$$

In a numerical formula (2), Yave' is an average value of the brightness information predicted from Yave. delta[dB] is the exposure compensation amount.

[Numerical formula 3]

$$Y\text{max}' = 10^{\frac{-delta}{20}} \times Y\text{max} \quad (3)$$

In a numerical formula (3), Ymax' is a maximum value of the brightness information predicted from Ymax. It satisfies the relation Ymax'<=MAXLIMIT (physical brightness maximum value). delta[dB] is the exposure compensation amount.

Ymin', Yave' and Ymax' as the prediction brightness information determined by calculation of the above-described numerical formulae (1) to (3) always satisfy the relation Ymin'<=Yave'<=Ymax', and intervals of their values are apart adequately. Here, three points, i.e., the minimum value (Ymin), the average value (Yave) and the maximum value (Ymax) of the brightness information are used by way of explanation. However, the number of the points are not fixed, and any points can be used.

The modulation curve X (FIG. 4) is generated using thus determined prediction brightness information (Ymin', Yave', Ymax'). By the modulation curve X, the synthesized data item before the gradation conversion (for example, 14-bit gradation) as the input data are gradation-converted and gradation-compressed into a synthesized data item (for example, 10-bit gradation) after the gradation conversion as the output data.

Specifically, in the overexposure setting in FIG. 4, the three points, i.e., the minimum value (Ymin(C)), the average value (Yave (C)) and the maximum value (Ymax(C)) in the histogram C representing the brightness information acquired by detecting the synthesized data item before the gradation conversion, and the exposure compensation amount (delta) used in the exposure control are used to calculate the numerical formulae (1) to (3). This allows to determine the minimum value (Ymin'(C)), the average value (Yave'(C)) and the maximum value (Ymax'(C)) as the prediction brightness information. Using the prediction brightness information, the modulation curve X is generated.

Then, by converting the histogram C upon the overexposure setting according to the modulation curve X, the gradation-compressed histogram C" is acquired. The gradation-compressed histogram C" is reflected by an effect of the exposure compensation shown in FIG. 4.

In the underexposure setting in FIG. 4, the three points, i.e., the minimum value (Ymin(E)), the average value (Yave (E)) and the maximum value (Ymax(E)) in the histogram E representing the brightness information acquired by detecting the synthesized data item before the gradation conversion, and the exposure compensation amount (delta) used in the exposure control are used to calculate the numerical formulae (1) to (3). This allows to determine the minimum value (Ymin'(E)), the average value (Yave'(E)) and the maximum value (Ymax'(E)) as the prediction brightness information. Using the prediction brightness information, the modulation curve X is generated.

Then, by converting the histogram E upon the underexposure setting according to the modulation curve X, the gradation-compressed histogram E" is acquired. The gradation-compressed histogram E" is reflected by an effect of the exposure compensation shown in FIG. 4.

Upon the exposure compensation off in FIG. 4, the modulation curve X is generated from the brightness information in the histogram D (minimum value (Ymin(D)), average value (Yave (D)) and maximum value (Ymax(D))). By converting the histogram D upon the exposure compensation off according to the modulation curve X, the gradation-compressed histogram D" is acquired.

As described above, when the exposure compensation is performed, in the synthesized data item of the automatic gradation conversion control, the exposure compensation amount is taken into consideration. An optimal modulation curve is generated using the brightness information (for example, Ymin, Yave, Ymax) acquired by detecting the synthesized data item. As shown in FIG. 3, the brightness information (for example, Ymin, Yave, Ymax) itself is underexposure or overexposure to the original brightness information, which inhibits the exposure compensation of the synthesized data item. In other words, when the exposure compensation amount is not taken into consideration in the brightness information for the gradation conversion, the exposure compensation of the synthesized data item is possible.

As shown in FIG. 4, according to the present technology, the brightness information (for example, Ymin, Yave, Ymax) acquired by detecting the synthesized data item and the prediction brightness information (for example, Ymin', Yave', Ymax') determined from the exposure compensation amount (delta) used in the exposure control are used as the brightness information for the gradation conversion, thereby generating an optimal modulation curve. Using the modulation curve, the synthesized data item are gradation-converted, thereby acquiring a synthesized data item reflected by the effect of the exposure compensation.

2. Configuration of Image Capturing Apparatus

Figure 5:
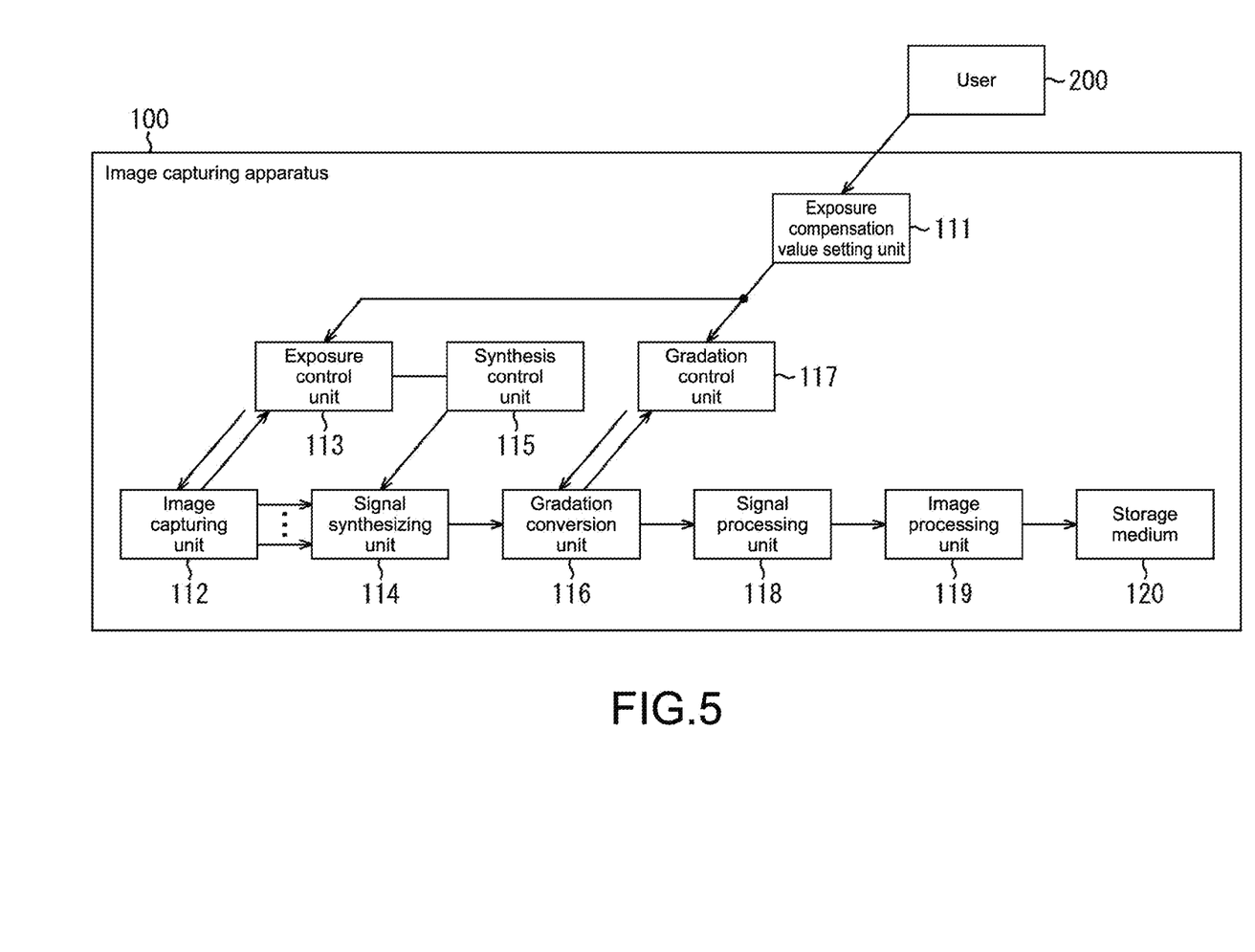
FIG. 5 is a block diagram showing a configuration of an embodiment of an image capturing apparatus to which the present technology is applied.

Next, an embodiment of an image capturing apparatus to which the present technology is applied will be described that can perform the gradation conversion control using the prediction brightness information in FIG. 4. FIG. 5 is a block diagram showing a configuration of an embodiment of the image capturing apparatus to which the present technology is applied.

The image capturing apparatus 100 in FIG. 5 is an electronic device having an image capturing function such as a digital still camera, a smartphone, and a mobile phone, for example. The image capturing apparatus 100 performs the image capturing processing depending on the operation by the user 200, and stores the image data of the captured image of the object. Also, the image capturing apparatus 100 can capture an image in a normal image capturing mode of normal image capturing processing and also in an HDR mode, thereby generating the high dynamic range synthesized image.

In FIG. 5, the image capturing apparatus 100 is configured of an exposure compensation value setting unit 111, an image capturing unit 112, an exposure control unit 113, a signal synthesizing unit 114, a synthesis control unit 115, a gradation conversion unit 116, a gradation control unit 117, a signal processing unit 118, an image processing unit 119 and a storage medium 120.

The exposure compensation value setting unit 111 sets the exposure compensation value (for example, ⅓ EV, −4/3 EV, etc.) according to the operation by the user 200. When the exposure compensation value is set, the exposure control unit 113 converts the exposure compensation value into a unit that can control the exposure compensation, and the exposure compensation value setting unit 111 feeds the exposure compensation amount thus acquired to the exposure control unit 113 and the gradation control unit 117. In other words, the exposure compensation value setting unit 111 is an exposure compensation amount setting unit that sets the exposure compensation amount corresponding to the exposure compensation value.

The image capturing unit 112 is configured of, for example, an image capturing device such as a CMOS (Complementary Metal-Oxide Semiconductor) image sensor, converts an optical image incident through a lens (not shown) into an electrical signal of a voltage value by photoelectric conversion for every pixel, accumulates the electrical signal, and feeds the electrical signal to the signal synthesizing unit 114 as the captured-image data item.

Also, the image capturing unit 112 adjusts the exposure according to the control from the exposure control unit 113. The exposure control unit 113 is a block for realizing the above-described automatic exposure control. The exposure control unit 113 controls the exposure of the image capturing unit 112 on the basis of the exposure compensation amount from the exposure compensation value setting unit 111 to perform the exposure compensation. When the HDR mode is set, the image capturing unit 112 generates a plurality of captured-image data items such as the captured-image data items exposed for a short time and the captured-image data items exposed for a long time at a plurality of different exposure amounts set by the exposure control unit 113, and feeds the captured-image data items to the signal synthesizing unit 114.

When the HDR mode is set, the signal synthesizing unit 114 synthesizes a plurality of captured-image data items from the image capturing unit 112, generates the synthesized data item, and feeds the synthesized data item to the gradation conversion unit 116 according to the synthesis control unit 115. When a normal image capture mode is set, the signal synthesizing unit 114 feeds the captured-image data items fed from the image capturing unit 112 as it is to the gradation conversion unit 116.

The synthesis control unit 115 controls synthesis processing of the plurality of captured-image data items by the signal synthesizing unit 114 so as to provide a synthesis ratio according to the exposure control by the exposure control unit 113, for example. In this manner, the captured-image data items such as the captured-image data item by long time exposure and the captured-image data item by short time exposure are synthesized, for example. The synthesized data item acquired as a result are fed to the gradation conversion unit 116.

When the normal image capture mode is set, the gradation conversion unit 116 gradation-converts the captured-image data items from the signal synthesizing unit 114 according to the control from the gradation control unit 117, and feeds the gradation-compressed captured-image data items acquired as a result to the signal processing unit 118. Also, when the HDR mode is set, the gradation conversion unit 116 gradation-converts the synthesized data item from the signal synthesizing unit 114 according to the control from the gradation control unit 117, and feeds the gradation-compressed synthesized data item acquired as a result to the signal processing unit 118.

The gradation control unit 117 is a block for realizing the above-described automatic gradation conversion control. When the HDR mode is set, the gradation control unit 117 controls such that the gradation conversion using the prediction brightness information (FIG. 4) is performed in the gradation conversion unit 116 on the basis of the exposure compensation amount from the exposure compensation value setting unit 111.

The signal processing unit 118 applies camera signal processing to the captured-image data items or the synthesized data item from the gradation conversion unit 116, and feeds the captured-image data items or the synthesized data item acquired as a result to the image processing unit 119. The image processing unit 119 applies image processing to the captured-image data items or the synthesized data item from the signal processing unit 118 such as compact encoding into a JPEG (Joint Photographic Experts Group) format file, and stores the image data files acquired as a result to the storage medium 120.

3. Flow of Image Capturing Processing

Figure 6:
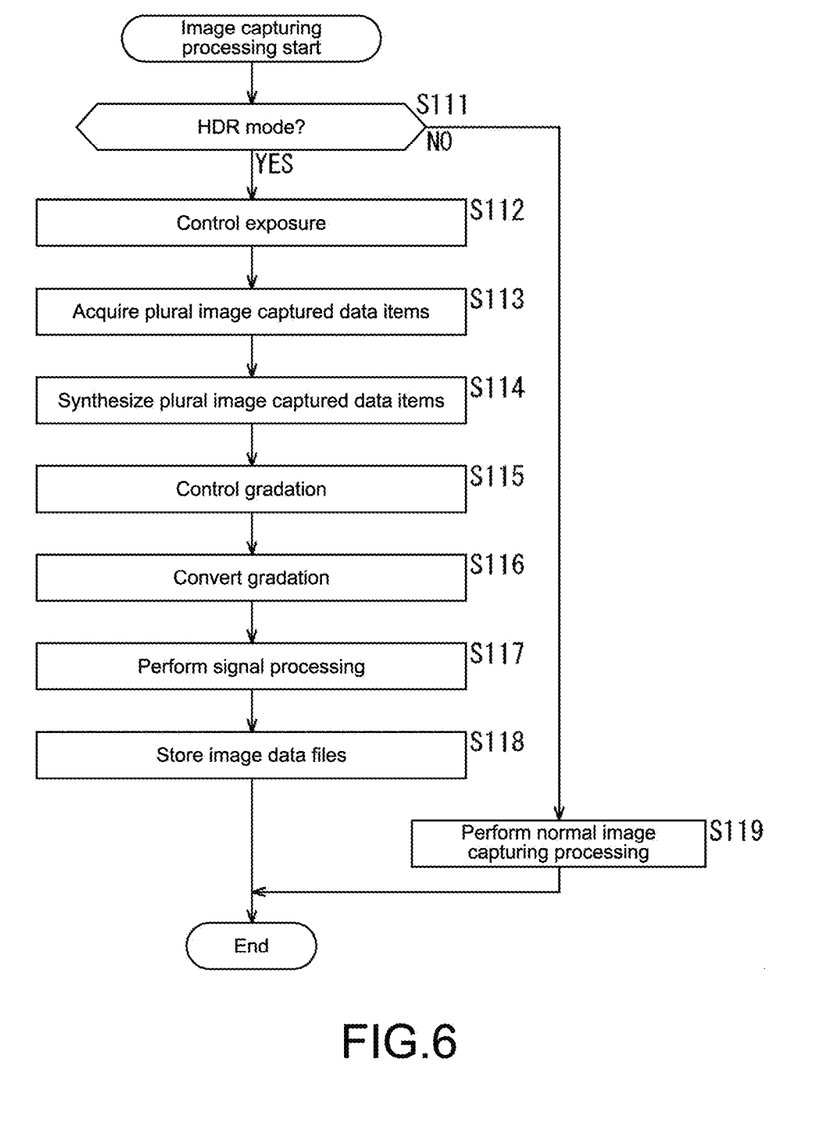
FIG. 6 is a flow chart for explaining a flow of image capturing processing.

Next, referring to the flow chart in FIG. 6, a flow of the image capturing processing executed by the image capturing apparatus 100 in FIG. 5 will be described. The image capturing processing is executed when the user 200 performs an image capturing operation such as a shutter button press, for example. In the image capturing apparatus 100, the exposure compensation value (for example, ⅓ EV, −4/3 EV etc.) is set in advance by the operation by the user 200.

In Step S111, it determines that the HDR mode is set as the image capturing mode of the image capturing apparatus 100. In Step S111, when it determines that the HDR mode is set, the processing proceeds to Step S112.

In Step S112, the exposure control unit 113 performs the exposure compensation on the basis of the exposure compensation amount from the exposure compensation value setting unit 111, and controls the exposure of the image capturing unit 112. In this manner, the image capturing unit 112 adjusts the exposure according to the control from the exposure control unit 113 in Step S112.

In Step S113, the image capturing unit 112 acquires (generates) a plurality of captured-image data items such as captured-image data items by long time exposure and captured-image data items by short time exposure at a plurality of different exposure amounts set by the exposure control unit 113, and feeds the captured-image data items to the signal synthesizing unit 114.

In Step S114, the signal synthesizing unit 114 synthesizes the plurality of captured-image data items from the image capturing unit 112 according to the control from the synthesis control unit 115, generates a synthesized data item, and feeds the synthesized data item to the gradation conversion unit 116.

In Step S115, the gradation control unit 117 controls such that the gradation conversion using the prediction brightness information (FIG. 4) is performed in the gradation conversion unit 116 on the basis of the exposure compensation amount from the exposure compensation value setting unit 111.

In Step S116, the gradation conversion unit 116 gradation-converts the synthesized data item (synthesized data item before the gradation conversion) from the signal synthesizing unit 114 according to the control from the gradation control unit 117 in Step S115, and feeds a gradation-compressed synthesized data item (synthesized data item after the gradation conversion) to the signal processing unit 118.

In Step S117, the signal processing unit 118 applies camera signal processing to the synthesized data item from the gradation conversion unit 116, and feeds the synthesized data item acquired as a result to image processing unit 119.

In Step S118, the image processing unit 119 applies image processing to the synthesized data item from the signal processing unit 118 such as compact encoding into, for example, a JPEG format file, and stores the image data files acquired as a result to the storage medium 120. In this manner, in the image capturing apparatus 100, the image data files corresponding to the high dynamic range synthesized image are stored.

In Step S111, when it determines that the HDR mode is not set, i.e., the normal image capture mode is set, the processing proceeds to Step S119. In Step S119, the normal image capturing processing is performed, and the image data file corresponding to the normal captured image is stored in the storage medium 120.

As above, the flow of the image capturing processing is described. In the image capturing processing, when the HDR mode is set, the exposure compensation is realized by the exposure compensation (S112) using the exposure compensation amount by the exposure control unit 113, and the gradation conversion control (S115) using the exposure compensation amount by the gradation control unit 117. As a result, the user can perform desirable exposure compensation to the high dynamic range synthesized image.

(Example of High Dynamic Range Synthesized Image Subjected to Exposure Compensation)

Figure 7:
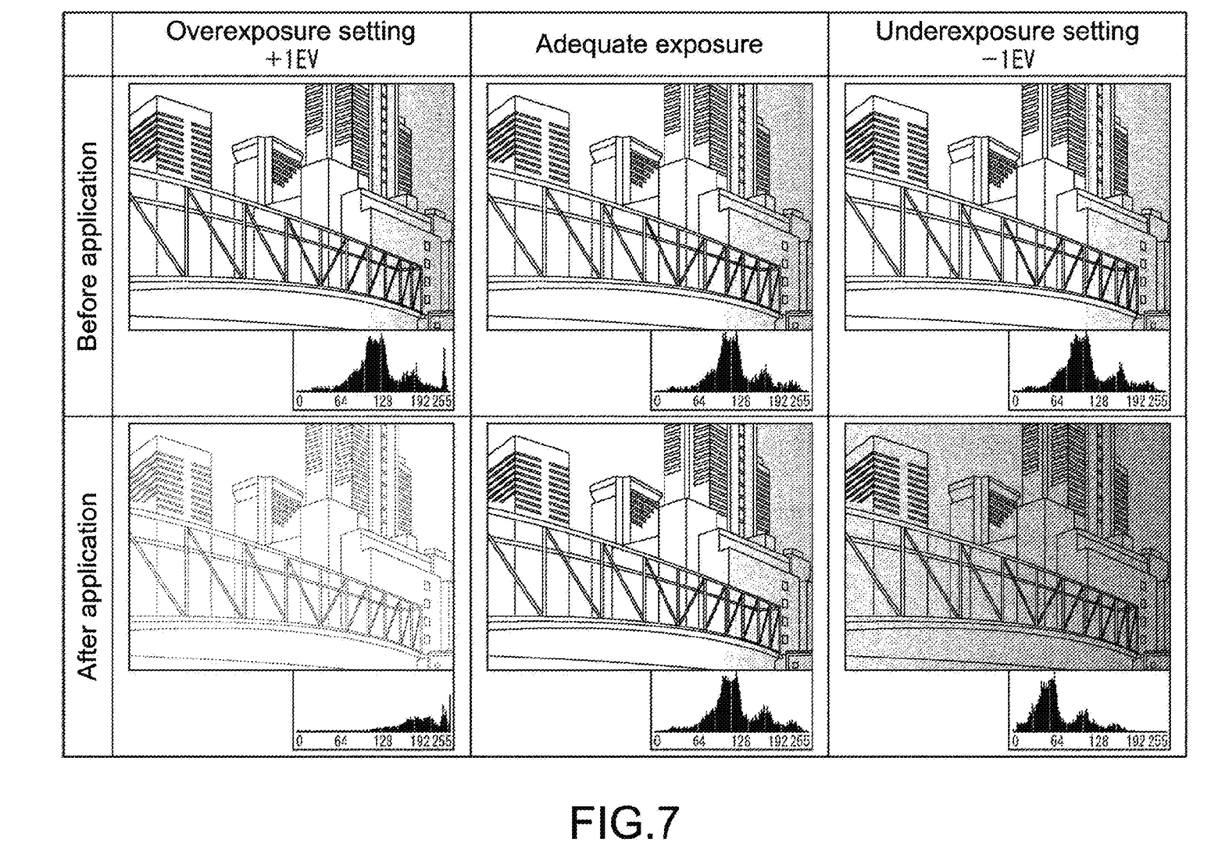
FIG. 7 is a diagram showing examples of high dynamic range synthesized images to which the exposure compensation is subjected.

FIG. 7 is a diagram showing examples of the high dynamic range synthesized images to which the exposure compensation is subjected.

FIG. 7 shows the high dynamic range synthesized images (three images on a lower side in the figure after the application) when the gradation conversion control (FIG. 4) according to the present technology is performed, and the high dynamic range synthesized images (three images on an upper side in the figure before the application) when the gradation conversion control (FIG. 3) not according to present technology is performed. It shows the effect of the exposure compensation to the high dynamic range synthesized image before and after the application.

As the gradation conversion control in FIG. 3 is performed on the three images on an upper side in the figure before the application in FIG. 7, the histograms have the same value within the same range of the output data upon adequate exposure, the overexposure setting (+1 EV) and the underexposure setting (−1 EV). As a result, even when the user sets the exposure compensation value, the effect of the exposure compensation is hardly reflected on the images before the application, and the three images before the application have similar lightness.

On the other hand, as the gradation conversion according to the modulation curve generated using the prediction brightness information by the gradation conversion control in FIG. 4 is performed on the three images on a lower side in the figure after the application in FIG. 7, the image upon the overexposure setting (+1 EV) is lighter than the adequate exposure, and the image upon the underexposure setting (−1 EV) is darker than the adequate exposure. That is to say, the effect of the exposure compensation is reflected on the images after the application.

As described above, by performing the gradation conversion control (FIG. 4) to which the present technology is applied, the exposure compensation desired by the user can be performed on the high dynamic range synthesized image.

In addition, according to the present technology, as the exposure compensation is realized by the exposure control and the gradation conversion control, a high dynamic range synthesized image having a higher image quality can be acquired as compared to the exposure control only by the gradation conversion. In other words, the exposure compensation can be performed on the image synthesized by performing the gradation conversion. However, when the overexposure compensation is performed, noises are dominant at a low brightness part. When the underexposure compensation is performed, color reproduction is not good at a nearly saturated portion of a high brightness part. Thus, there is a problem that a high quality image is not provided. By the exposure control and the gradation conversion control, the exposure compensation is realized, thereby solving the problem.

Furthermore, in the image capturing apparatus 100 (FIG. 5), the exposure control unit 113 and the gradation control unit 117 as exposure compensation means for performing the exposure compensation are realized on a software basis by a microprocessor and a compensation program executed by the microprocessor. There is no need to add a new special hardware circuit, and it can be realized at relatively low costs. It can correspond to the existing image capturing apparatus 100 by updating the compensation program.

4. Alternative Embodiment

Multiplying Exposure Compensation Amount by Factor

Figure 8:
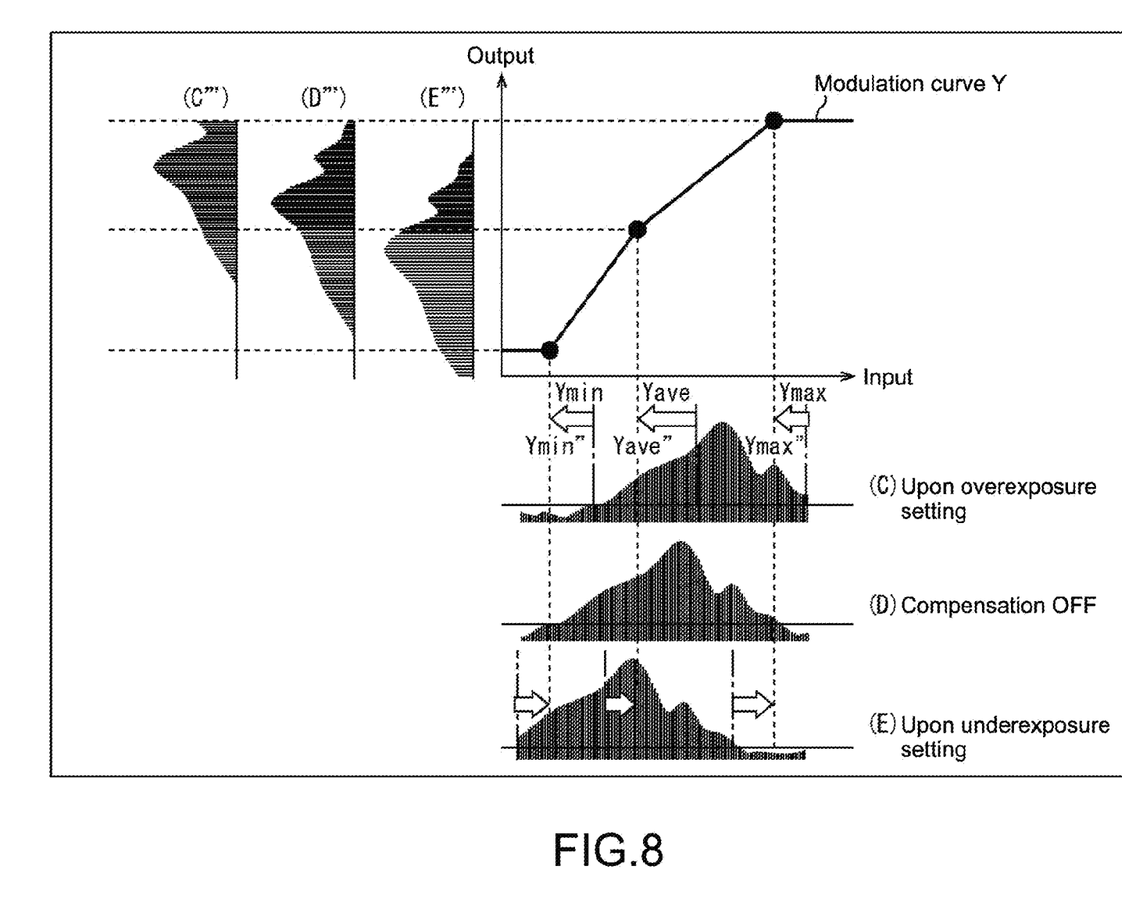
FIG. 8 is a diagram for explaining a gradation conversion control using a prediction value acquired by multiplying an exposure compensation amount by a factor.

FIG. 8 is a diagram for explaining a gradation conversion control using a prediction value acquired by multiplying the exposure compensation amount by a factor. In FIG. 8, a vertical axis (X axis) represents input data before the gradation conversion, and a horizontal axis (Y axis) represents output data after the gradation conversion.

FIG. 8 shows a histogram C upon overexposure setting, a histogram D upon exposure compensation off, and a histogram E upon underexposure setting about the synthesized data item before the gradation conversion as the input data in the X axis. Also, FIG. 8 shows a histogram C''' upon overexposure setting, a histogram D''' upon exposure compensation off, and a histogram E''' upon underexposure setting about the synthesized data item after the gradation conversion as the output data in the Y axis.

In the gradation conversion control in FIG. 8, the factor for multiplying the exposure compensation amount in addition to the brightness information acquired by detecting the synthesized data item before the gradation conversion and the exposure compensation amount used in an exposure control are used to calculate by the following numerical formulae (4) to (6) to determine the prediction brightness information taking the exposure compensation amount into consideration.

[Numerical formula 4]

$$Y\text{min}'' = 10^{\frac{-(delta \times k1)}{20}} \times Y\text{min} \quad (4)$$

In a numerical formula (4), Ymin'' is a minimum value of the brightness information predicted from Ymin. Also, it satisfies the relation Ymin''=>MINLIMIT (physical brightness minimum value). k1 represents an application ratio to the exposure compensation amount (delta[dB]), and can adjust the effect of the exposure compensation.

[Numerical formula 5]

$$Y\text{ave}'' = 10^{\frac{-(delta \times k2)}{20}} \times Y\text{ave} \quad (5)$$

In a numerical formula (5), Yave'' is an average value of the brightness information predicted from Yave. k2 represents an application ratio to the exposure compensation amount (delta[dB]), and can adjust the effect of the exposure compensation.

[Numerical formula 6]

$$Y\text{max}'' = 10^{\frac{-(delta \times k3)}{20}} \times Y\text{max} \quad (6)$$

In a numerical formula (6), Ymax'' is a maximum value of the brightness information predicted from Ymax. It satisfies the relation Ymax''<=MAXLIMIT (physical brightness maximum value). k3 represents an application ratio to the exposure compensation amount (delta[dB]), and can adjust the effect of the exposure compensation.

Ymin", Yave" and Ymax" as the prediction brightness information determined by calculation of the above-described numerical formulae (4) to (6) always satisfy the relation Ymin"<=Yave"<=Ymax", and intervals of their values are distant adequately.

The modulation curve Y (FIG. 8) is generated using the prediction brightness information determined by calculating the formulae (4) to (6) similar to the gradation conversion control in FIG. 4. By the modulation curve Y, a synthesized data item before the gradation conversion (for example, 14-bit gradation) as the input data are gradation-converted and gradation-compressed into a synthesized data item (for example, 10-bit gradation) after the gradation conversion as the output data.

As described above, the different factors k1, k2, and k3 are applied to the exposure compensation amount (delta) used when calculating Ymin", Yave", Ymax" to give some differences to the exposure compensation amount. In this manner, it is possible to perform more natural exposure compensation. The above-descried method to multiply the exposure compensation amount by the factor is illustrative for giving some differences to the exposure compensation amount. Other methods may be used.

(Log Conversion of Brightness Information)

When the prediction brightness information taken the exposure compensation amount into consideration is determined by calculating the numerical formulae (1) to (3), the calculation of the numerical formulae (1) to (3) can be performed only by addition and subtraction by using conversion values (for example, MIN value, AVE value, MAX value) provided by log converting the brightness information (for example, Ymin, Yave, Ymax). In this manner, a calculation amount can be decreased.

(Prediction Value is Applied at Output Data Side)

In the above-described gradation conversion control in FIG. 4, the prediction brightness information as the prediction value is applied at the input data (X axis) side. The prediction brightness information as the prediction value may be not applied at the input data (X axis) side, but applied at an output data (Y axis) side.

Figure 9:
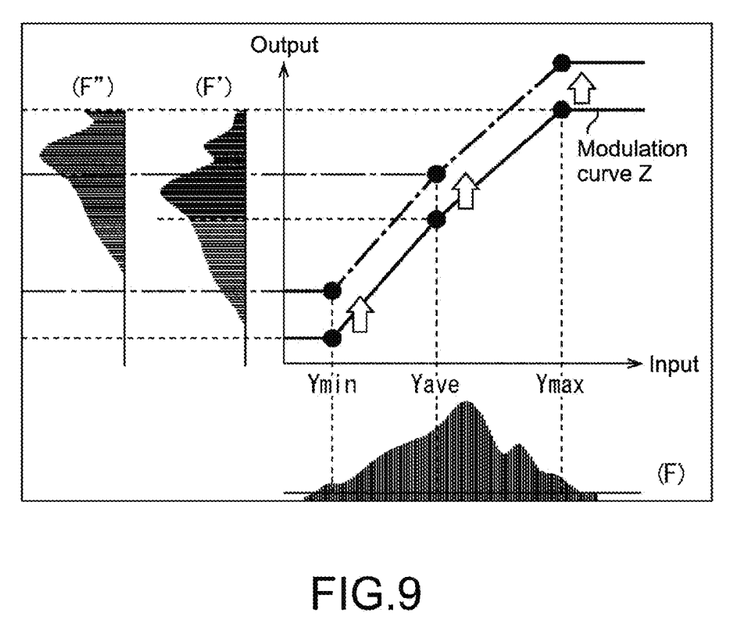
FIG. 9 is a diagram for explaining a gradation conversion control when a prediction value is applied at an output data side.

FIG. 9 is a diagram for explaining the gradation conversion control when the prediction value is applied at the output data side. In FIG. 9, a vertical axis (X axis) represents the input data before the gradation conversion, and a horizontal axis (Y axis) represents the output data after the gradation conversion.

FIG. 9 shows a histogram F about the synthesized data item before the gradation conversion as the input data in the X axis. Three points, i.e., a minimum value (Ymin(F)), an average value (Yave (F)), and a maximum value (Ymax(F)) in the histogram F are used to generate a modulation curve Z. Then, the histogram F is converted according to the modulation curve Z, thereby providing a gradation-compressed histogram F'.

Then, the prediction brightness information is applied to the histogram F' gradation converted as the prediction value, thereby acquiring a histogram F". In this manner, the prediction brightness information is applied at the output data side (Y axis) as the prediction value, and the histogram F' about the synthesized data item after the gradation conversion is changeable to the histogram F", thereby acquiring the synthesized data item on which the effect of the exposure compensation function is reflected.

(Configuration Example of Semiconductor Apparatus) In the image capturing apparatus 100 in FIG. 5, the image capturing unit 112, the exposure control unit 113, the signal synthesizing unit 114, the synthesis control unit 115, the gradation conversion unit 116, the gradation control unit 117, and the signal processing unit 118 may be configured of a semiconductor apparatus such as a CMOS image sensor. Note that the configuration of semiconductor apparatus is illustrative. For example, the signal processing unit 118 may be excluded from the configuration, and a part of configuration components may be disposed externally.

Figure 10:
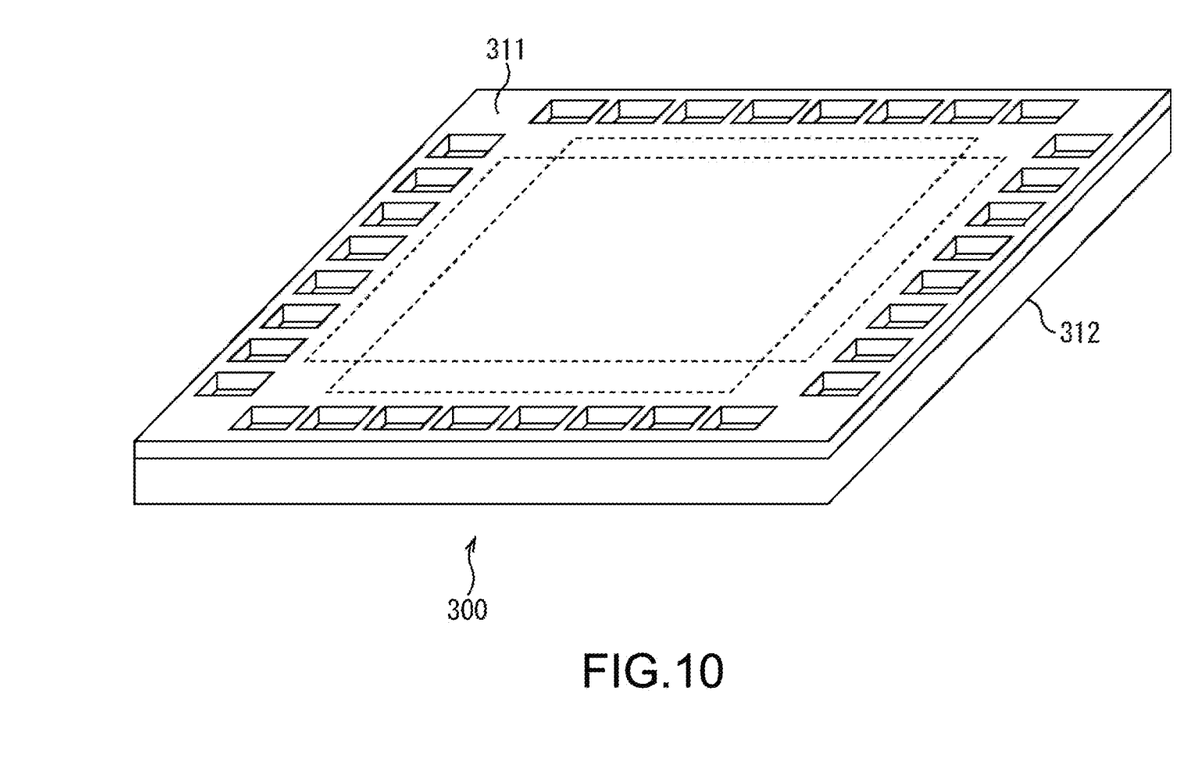
FIG. 10 is a diagram showing a configuration example of a semiconductor device.

FIG. 10 shows a configuration example of a semiconductor device. In FIG. 10, a solid state image capturing apparatus 300 has a laminated structure including a first chip (upper chip) 311 and a second chip (lower chip) 312. In the laminated structure including the upper and lower two chips, the first chip 311 is configured of a CMOS image sensor chip, and includes the image capturing unit 112 of the configuration components of the above-described semiconductor apparatus, for example. As the CMOS image sensor, for example, a backside illumination type CMOS image sensor may be used.

The second chip 312 is configured of a logic chip including a control circuit and an image processing circuit of the first chip 311, and includes the exposure control unit 113, the signal synthesizing unit 114, the synthesis control unit 115, the gradation conversion unit 116, the gradation control unit 117 and the signal processing unit 118 of the configuration components of the above-described semiconductor apparatus, for example.

(Exposure Control in Pixel Unit)

In the above description, although the exposure control in a frame unit is descried, the exposure control may be performed in a pixel unit. The exposure control in a pixel unit has been already suggested in Japanese Patent No. 4661922 (Japanese Patent Application Laid-open No. 2010-62785), for example. Japanese Patent No. 4661922 discloses a solid state image capturing device where pixels that expose continuously for a long time and pixels that repeat short time exposure intermittently and output every time are arrange in a checkboard pattern.

The present technology is not limited to the above-described embodiments, and variations and modifications may be made without departing from the scope of the present technology.

The present technology may have the following configurations.

(1) An image capturing apparatus, including:

an image capturing unit that captures an image of an object and generates a captured-image data item;

an exposure compensation amount setting unit that sets an exposure compensation amount for compensating an exposure amount of the image capturing unit;

an exposure control unit that controls exposure of the image capturing unit on the basis of the exposure compensation amount set by the exposure compensation amount setting unit;

a signal synthesizing unit that synthesizes a plurality of the captured-image data items captured by the image capturing unit at a plurality of different exposure amounts set by the exposure control unit and generates a synthesized data item;

a gradation conversion unit that converts gradation of the synthesized data item generated by the signal synthesizing unit; and a gradation control unit that controls gradation conversion by the gradation conversion unit on the basis of the exposure compensation amount set by the exposure compensation amount setting unit.

(2) The image capturing apparatus according to (1), in which the gradation control unit predicts a synthesized data item before exposure compensation using the exposure compensation amount set by the exposure compensation amount setting unit and brightness information of the synthesized data item, and controls gradation conversion by the gradation conversion unit according to a modulation curve generated using a result of the prediction.

(3) The image capturing apparatus according to (2), in which the gradation control unit uses a minimum value, an average value, and a maximum value of the brightness information as the brightness information of the synthesized data item.

(4) The image capturing apparatus according to (2) or (3), in which the gradation control unit uses the exposure compensation amount for predicting the synthesized data item before the exposure compensation different from the exposure compensation amount for compensating the exposure amount of the image capturing unit.

(5) An image capturing method for an image capturing apparatus, including the steps of:

by the image capturing apparatus,
capturing an image of an object and generating a captured-image data item;
setting an exposure compensation amount for compensating an exposure amount of an image capturing unit;
controlling exposure of the image capturing unit on the basis of the exposure compensation amount set;
synthesizing a plurality of the captured-image data items captured by the image capturing unit at a plurality of different exposure amounts and generating a synthesized data item;
controlling gradation conversion of the generated synthesized data item on the basis of the exposure compensation amount set; and
converting gradation of the generated synthesized data item.

DESCRIPTION OF REFERENCE NUMERALS 100 image capturing apparatus
111 exposure compensation value setting unit
112 image capturing unit
113 exposure control unit
114 signal synthesizing unit
115 synthesis control unit
116 gradation conversion unit
117 gradation control unit
118 signal processing unit
119 image processing unit
120 storage medium
300 solid state image capturing apparatus
311 first chip
312 second chip

The invention claimed is:

1. An image capturing apparatus, comprising:
a processor configured to:
control a camera to capture an image of an object and generate a captured-image data item;
set a first exposure compensation amount for compensation of an exposure amount of the camera;
control exposure of the camera based on the set first exposure compensation amount;
synthesize a plurality of the captured-image data items at a plurality of different set exposure amounts and generate a synthesized data item;
predict the synthesized data item before exposure compensation, based on a second exposure compensation amount and brightness information of the synthesized data item;
convert gradation of the synthesized data item; and
control the conversion of the gradation based on the set first exposure compensation amount.

2. The image capturing apparatus according to claim 1, wherein the control of the conversion of the gradation is based on a modulation curve, and
wherein the modulation curve is generated based on the prediction.

3. The image capturing apparatus according to claim 1, wherein the brightness information of the synthesized data item comprises a minimum value, an average value, and a maximum value of brightness of the synthesized data item.

4. The image capturing apparatus according to claim 1, wherein the second exposure compensation amount for the prediction of the synthesized data item before the exposure compensation is different from the set first exposure compensation amount for the compensation of the exposure amount of the camera.

5. An image capturing method for an image capturing apparatus, comprising:
by the image capturing apparatus:
capturing an image of an object and generating a captured-image data item;
setting a first exposure compensation amount for compensating an exposure amount of a camera;
controlling exposure of the camera based on the first exposure compensation amount set;
synthesizing a plurality of the captured-image data items captured by the camera at a plurality of different exposure amounts and generating a synthesized data item;
predicting the synthesized data item before exposure compensation, based on a second exposure compensation amount and brightness information of the synthesized data item;
controlling gradation conversion of the generated synthesized data item based on the first exposure compensation amount set; and
converting gradation of the generated synthesized data item.

* * * * *